(12) United States Patent
Agnoli

(10) Patent No.: US 6,234,627 B1
(45) Date of Patent: May 22, 2001

(54) EYEGLASS DEVICES WITH REMOVABLE SUPPLEMENTAL LENS

(75) Inventor: Giancarla Agnoli, Puos D'Alpago (IT)

(73) Assignee: Marchon Eyewear, Inc., Melville, NY (US)

( * ) Notice: Subject to any disclaimer, the term of this patent is extended or adjusted under 35 U.S.C. 154(b) by 0 days.

(21) Appl. No.: 09/569,115

(22) Filed: May 10, 2000

(51) Int. Cl.[7] ................ G02C 9/00; G02C 7/08

(52) U.S. Cl. ............................. 351/47; 351/57

(58) Field of Search ................ 351/86, 83, 41, 351/92, 90, 103, 106, 47, 57

(56) References Cited

U.S. PATENT DOCUMENTS 3,884,561 * 5/1975 Kodys ........................ 381/86

* cited by examiner

Primary Examiner—Hung Xuan Dang
(74) Attorney, Agent, or Firm—Kramer Levin; Naftalis & Frankel LLP

(57) ABSTRACT

All improved ophthalmic mounting arrangement for a unitary removable eyeglass lens, together with an eyeglass frame for supporting said lens, is described. The face of the eyeglass frame is equipped with a pair inwardly facing tabbed projections each having a channel for inserting an edge of the unitary lens. The outer periphery of the lens containing notches which interlockingly engage the tabbed projections, such that the lens can be releasably mounted on the eyeglass frame by flexing the lens and inserting the lens notches into the channels in the tabbed projections.

9 Claims, 3 Drawing Sheets

EYEGLASS DEVICES WITH REMOVABLE SUPPLEMENTAL LENS

FIELD OF THE INVENTION

The present invention relates to ophthalmic devices, namely mounting arrangements for removable eyeglass lenses and sunglass lenses, together with eyeglass frames for supporting such removable lenses.

BACKGROUND OF THE INVENTION

This invention relates generally to eyewear, and more particularly to clip-on sunglasses or other lenses which are intended to be mounted on a pair of glasses or sunglasses, and the eyeglass frames for mounting of such lenses. In presently known lens mounting arrangements, lenses, usually light filtering lenses, are mounted onto an eyeglass frame by means of clamping mechanisms on the lenses. Moffitt, Jr., U.S. Pat. No. 4,451,127 discloses such clip-on sunglasses.

In other lens mounting arrangements, the lens is mounted into an eyeglass frame by means of a "tongue and groove" connection between the lens and the interior of the eyeglass frame. Such configurations are described in U.S. Pat. Nos. 4,730,915, 4,824,233, and 4,674,851, all to Jannard and U.S. Pat. No. 4,021,103 to Gaspari.

There is a need for detachable light filtering or protective lens system which presents an attractive appearance when assembled, while enabling the easy attachment and removal of the "clip-on" lens.

An object of the present invention is to provide a mounting structure for light filtering or protective lenses and other lenses atop eyeglass and sunglass frames. A further object of the invention is to provide ease of attachment and detachment of the mounted lenses atop the eyeglass or sunglass frames. Yet a further object of the invention is to provide an eyeglass frame plus clip-on lens assembly which has an attractive appearance and which is easily manufactured.

OBJECTS AND SUMMARY OF THE INVENTION

The objects of the invention can be realized with a flexible unitary transparent lens extending the length and width of an eyeglass frame and having notches on the outer perimeter of the lens which are complementary to tabbed projections mounted on the eyeglass frame. The unitary lens of the invention is mounted on the eyeglass frame by placing the lens over the eyeglass frame with the notches in the lens positioned over the tabbed projections on the outer perimeter of the eyeglass frame and then flexing the lens to insert it behind the tabbed projections on the frame. When the flex in the lens is released, it slides behind the tabbed projections and is held to the frame. The lens is secured to the frame by means of the engagement of the notches with the tabbed projections on the perimeter of the eyeglass frame.

DESCRIPTION OF PREFERRED EMBODIMENTS

Figure 1:
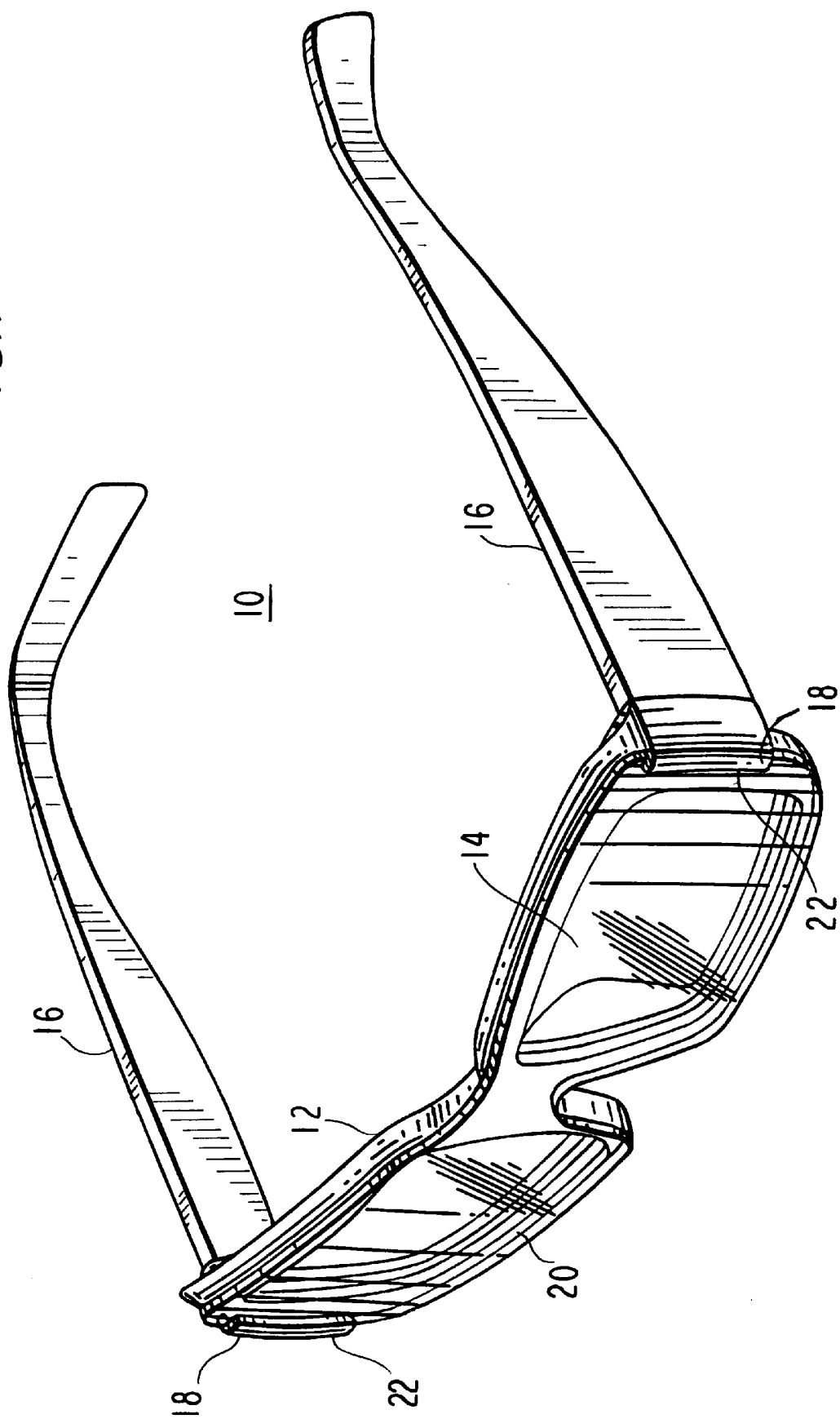
FIG. 1 is a representation, in perspective, of an eyeglass assembly provided in accordance with the invention.

Referring now to the drawings, and particularly to FIG. 1, an eyeglass assembly 10 in accordance with the invention includes an eyeglass frame face 12, which can be formed from rigid plastic, metal or other rigid material suitable for the purpose. Eyeglass frame face 12 contains eyeglass lenses 14 and ear stems 16 for affixation of the frame to the wearer's head. Eyeglass lenses 14 may be light filtering lenses, corrective lenses or clear lenses. Eyeglass frame 12 has tabbed projections 18 extending from the opposite sides of the outer perimeter of eyeglass frame face 12.

Unitary lens 20 is attached to frame face 12 by means of notches 22 in unitary lens 20, as discussed more fully below.

Figure 2:
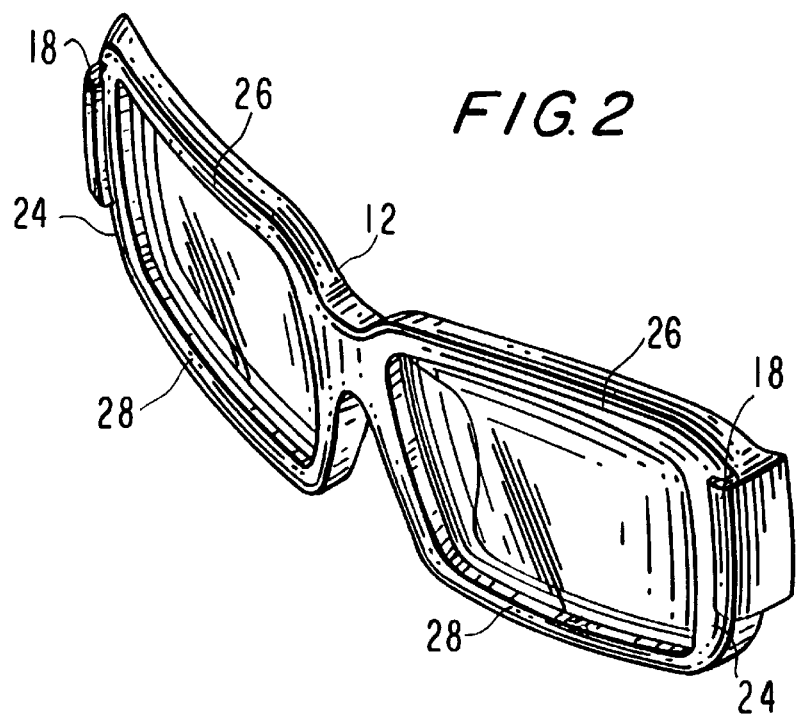
FIG. 2 is a perspective view of the eyeglass frame, without unitary lens, in accordance with the invention.
Figure 3:
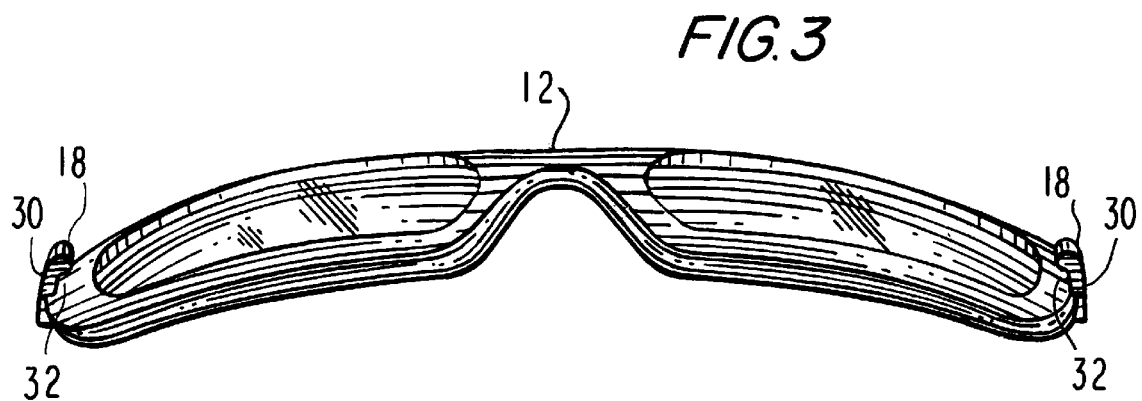
FIG. 3 is a perspective view of the front of the eyeglass frame, illustrating the relative height and size of the tabbed projections attached to said eyeglass frame.

FIG. 2 is a perspective view of frame face 12 without the unitary lens 20, revealing tabbed projections 18.

Frame face 12 can contain two or more tabbed projections 18 for affixation of unitary lens 20. Tabbed projections 18 extend from the vertically-oriented front-facing sides 24 of frame 12 to which ear stems 16 are attached. Alternatively, tabbed projections 18 can extend from the horizontally-oriented front-facing sides 26 and 28 of frame face 12. Preferably, projections 18 are attached to frame 12 at vertical sides 24.

Tabbed projections 18 are comprised of inwardly projecting fingers 30, the bottoms end of which are attached to frame face 12 at sides 24. The top end of each finger 30 is bent over creating lens channel 32 between the interior surface of finger 30 and the surface of frame face 12. Preferably, the top of fingers 30 is bent at an angle whereby the bottom surface of each finger 30 is substantially parallel to opposing surface of frame 12. The height of lens channel 32 is substantially same the thickness of unitary lens 20. Tabbed projection 18 prevents unitary lens 20 from moving away from the plane of frame face 12. Tabbed projections 18 can be fabricated as part of eyeglass frame 12, or can be produced separately and then affixed to eyeglass frame face 12 by means of adhesive or other method, such as solder, in the case of metal.

Tabbed projections 18 can be made of the same material as frame face 12, or of a different rigid material, such as metal, fiberglass or rigid plastic, suitable for the purpose.

Figure 4A:
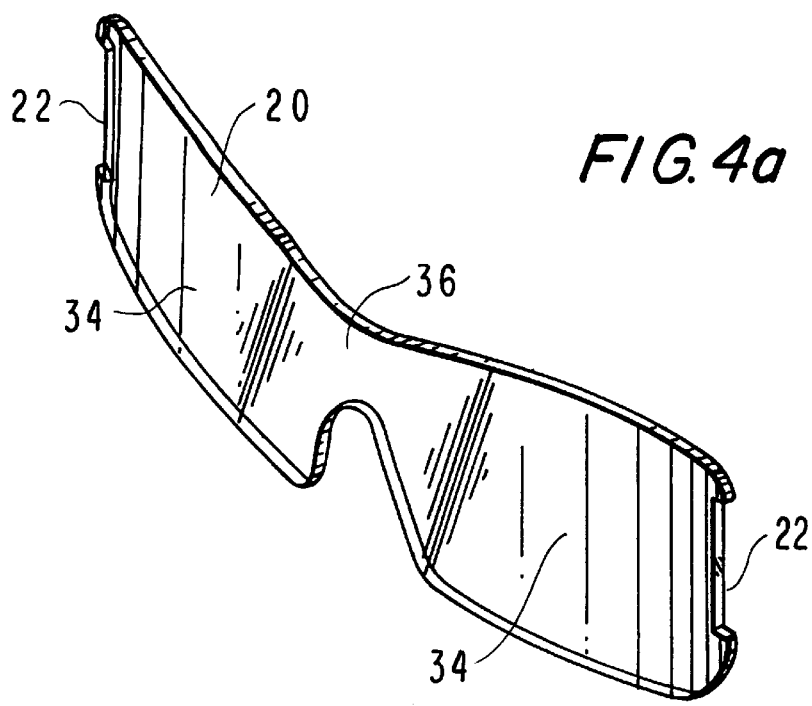
FIG. 4a is a perspective view of the unitary lens.
Figure 4B:
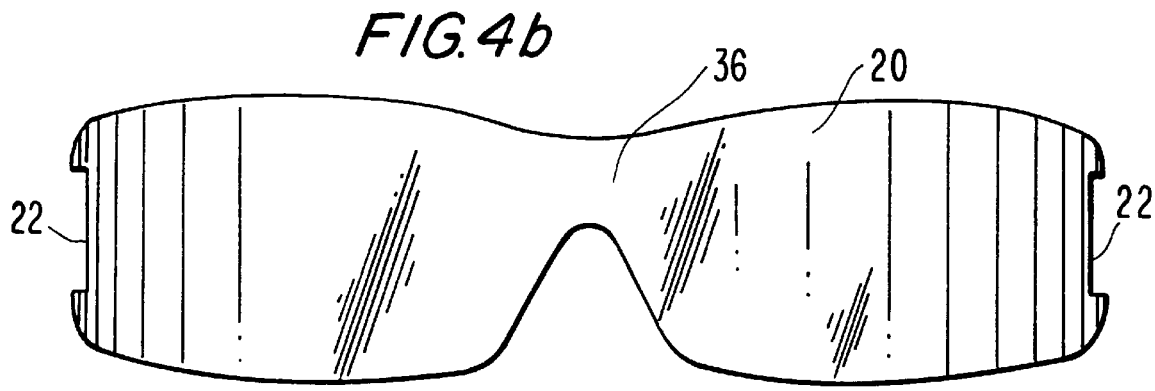
FIG. 4b is a frontal view of the unitary lens, provided in accordance with the invention.
Figure 5:
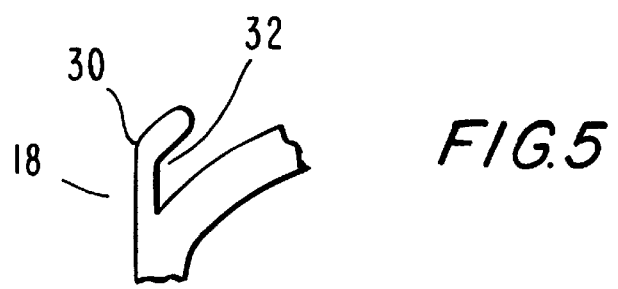
FIG. 5 is an exploded detail view of the lens retaining elements of the invention.

Unitary lens 20, illustrated in FIGS. 4a and 4b, can be a light filtering lens or a corrective vision lens. Unitary lens 20 can be made of plastic or other transparent material. Unitary lens 20 can be made of a single piece of transparent material, or can be made of a combination of elements, such as plastic in the "vision" areas 34 and metal in the nose bridge 36 area of the lens. Unitary lens 20 can, if desired, be constructed with a hinge at nose bridge 36. The hinge can be mechanical or a section of highly flexible material which to permits lens 20 to be folded in half for storage.

Notches 22 in unitary lens 20 are matched with tabbed projections 18 in width and with respect to their placement in relation to the perimeter of eyeglass frame face 12.

It is expected that unitary lens 20 will be the same size and shape as the front area of eyeglass frame face 12. However, unitary lens 20 can be somewhat different in size and shape than eyeglass frame face 12.

Unitary lens 20 is affixed to eyeglass frame 12 by sliding one end of lens 20 at notch 22 into lens channel 32 with the sides of notch 22 surrounding finger 30. Unitary lens 20 is then flexed away from the frame face 12 to shorten the linear distance between notches 22, so that the opposite notch 22 on lens 20 can be placed into the opposite channel 32. When the flexing of lens 20 is released, lens 20 fully extends into channels 32 with notches 22 partially surrounding fingers 30. This holds lens 20 to frame face 12 against upward or down pressures in plane of frame face 12 and against forward pressure perpendicular to the plane of frame face 12.

In another embodiment of the invention separate clip-on lenses are provided for the left and right lenses 28 of frame 12. In this embodiment of the invention at least two tabbed projections 18 are provided on the opposite sides of each lens 28. The structure of the individual lenses utilized in this embodiment of the invention is the same as aforedescribed for lens 20, with each lens having at least two notches 22 which cooperate with correspondings tabbed projections 18.

Although the present invention has been described in terms of the foregoing embodiment, such description has been for exemplary purposes only, and, as will be apparent to one of ordinary skill in the art, many alternatives, equivalents, and variations of varying degrees will fall within the scope of the present invention. That scope, accordingly, is not to be limited in any respect by the foregoing description, rather, it is defined only by the claims that follow.

What is claimed is:

1. An eyeglass device, comprising:
    (a) an eyeglass frame face having a forward facing front surface, said frame face having a periphery comprised of opposed left and right sides and opposed top and bottom sides;
    (b) said eyeglass frame face having at least a pair of complementary inwardly tabbed projections extending from opposite sides of said frame face, said tabbed projections defining lens channels between said front surface of said frame face and said tabbed projections;
    (c) a unitary flexible lens having a periphery surface and having a corresponding notch on said periphery surface for each tabbed projection on said frame face, each of said notches having a width which is substantially equal to the width of its corresponding tabbed projection; and
    (d) said unitary lens having a thickness at said notches which is substantially the same as the height of the lens channel for its corresponding tabbed projection, said lens sized so that it must be flexed to enable the mounting of said lens on said eyeglass frame by inserting said notches into said lens channels.

2. The eyeglass device of claim 1, wherein said inwardly tabbed projections are on the left and right sides of said eyeglass frame face.

3. The eyeglass device of claim 2, wherein said unitary flexible lens has left and right sides, said notches are in the left and right sides of said unitary lens, said notches are each comprised of a vertical side and opposed top and bottom sides and the distance between said vertical sides is substantially the same as the distance between the said tabbed projections at said lens channels, whereby said unitary lens must be flexed to be inserted into said lens channels.

4. The eyeglass device of claim 3, wherein said unitary flexible lens is a light filtering lens.

5. The eyeglass device of claim 3, wherein said unitary flexible lens is a corrective vision lens.

6. The eyeglass device of claim 3, wherein said unitary flexible lens has a shape and size which substantially conforms to the shape and size of said eyeglass face frame.

7. The eyeglass device of claim 1, wherein said unitary flexible lens has a shape and size which substantially conforms to the shape and size of said eyeglass face frame.

8. An eyeglass assembly as defined in claim 1, having eye glass lenses which are light filtering lenses.

9. An eyeglass assembly as defined in claim 1, having eye glass lenses which are corrective lenses.

* * * * *